United States Patent
Swartling et al.

(10) Patent No.: US 8,706,365 B2
(45) Date of Patent: Apr. 22, 2014

(54) METHOD FOR DETERMINATION OF NUMBERS OF GEAR STEPS

(75) Inventors: Fredrik Swartling, Södertälje (SE); Anders Kjell, Bromma (SE); Tom Nyström, Södertälje (SE)

(73) Assignee: Scania CV AB (SE)

( * ) Notice: Subject to any disclaimer, the term of this patent is extended or adjusted under 35 U.S.C. 154(b) by 62 days.

(21) Appl. No.: 13/393,557

(22) PCT Filed: Sep. 13, 2010

(86) PCT No.: PCT/SE2010/050971
§ 371 (c)(1), (2), (4) Date: Mar. 1, 2012

(87) PCT Pub. No.: WO2011/031228
PCT Pub. Date: Mar. 17, 2011

(65) Prior Publication Data
US 2012/0179340 A1  Jul. 12, 2012

(30) Foreign Application Priority Data
Sep. 14, 2009 (SE) ....................... 0950660

(51) Int. Cl.
*F16H 61/00* (2006.01)

(52) U.S. Cl.
USPC .......................................... 701/51

(58) Field of Classification Search
USPC .......................................... 701/51
See application file for complete search history.

(56) References Cited

U.S. PATENT DOCUMENTS

| | | | |
|---|---|---|---|
| 4,947,331 A | 8/1990 | Speranza | 364/424.1 |
| 5,036,730 A | 8/1991 | Sakai et al. | 74/866 |
| 6,067,495 A | 5/2000 | Fliearman et al. | |

(Continued)

FOREIGN PATENT DOCUMENTS

| | | |
|---|---|---|
| DE | 101 06 935 | 8/2002 |
| EP | 0 238 310 | 9/1987 |
| EP | 0 352 551 A2 | 1/1990 |

OTHER PUBLICATIONS

International Search Report mailed Dec. 14, 2011 in corresponding PCT International Application No. PCT/SE2010/050971.
Supplementary Search Report dated Aug. 19, 2013 issued in corresponding European Patent Application No. 10-815711.6.
Russian Federation Office Action, dated Sep. 9, 2013, issued in corresponding Russian Patent Application No. 2012114866/11(022456), filed Sep. 13, 2010. Total 5 pages.

(Continued)

*Primary Examiner* — Mary Cheung
*Assistant Examiner* — Michael Berns
(74) *Attorney, Agent, or Firm* — Ostrolenk Faber LLP

(57) ABSTRACT

A method for determination of numbers of gear steps for a gearbox in a motor vehicle which comprises an engine connected to drive a gearbox is disclosed. The numbers of gear steps are the number of downshifts or the number of upshifts which the gearbox respectively effects at an upshift point or a downshift point, a downshift point representing a first engine speed at which the gearbox effects a downshift, an upshift point representing a second engine speed at which the gearbox effects an upshift, and the numbers of gear steps being determined based on a predicted time period which the engine takes to change from a first engine speed to a second engine speed. A system, a motor vehicle, a computer program and a computer program product thereof for the method are also disclosed.

15 Claims, 3 Drawing Sheets

(56) References Cited

U.S. PATENT DOCUMENTS

| | | | |
|---|---|---|---|
| 6,325,743 B1 * | 12/2001 | Genise et al. | 477/124 |
| 7,499,784 B2 * | 3/2009 | Kresse | 701/61 |
| 2008/0064565 A1 | 3/2008 | Doi et al. | |
| 2008/0249693 A1 | 10/2008 | Kresse | 701/61 |
| 2012/0166054 A1 * | 6/2012 | Swartling et al. | 701/55 |

OTHER PUBLICATIONS

English translation of Russian Office Action, dated May 24, 2013, issued in corresponding Russian Patent Application No. 2012114866/11 (022456), 5 pages.

* cited by examiner

METHOD FOR DETERMINATION OF NUMBERS OF GEAR STEPS

CROSS-REFERENCE TO RELATED APPLICATIONS

The present application is a 35 U.S.C. §§371 national phase conversion of PCT/SE2010/050971, filed Sep. 13, 2010, which claims priority of Swedish Application No. 0950660-1, filed Sep. 14, 2009, the contents of which are incorporated by reference herein. The PCT International Application was published in the English language.

TECHNICAL FIELD

The present invention relates to a method for determining of numbers of gear steps for a gearbox in a motor vehicle. The invention further relates to a system, a motor vehicle, a computer program and a computer program product thereof for the method.

BACKGROUND TO THE INVENTION

FIG. 1 depicts schematically parts of a power train for a motor vehicle 1, such as a passenger car or a heavy vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices (e.g. clutch device 40, gearbox 20, propeller shaft 50, differential gear 30 and drive shafts 60) to powered wheels in order to move the vehicle 1. An important device in the power train is the gearbox 20, which has a number of forward gears for moving the vehicle 1 forwards, and usually also one or more reverse gears. The number of forward gears varies but modern kinds of trucks are usually provided with twelve forward gears.

The gearbox 20 may be of manual or automatic type (automatic gearbox), but also of the automatic manual gearbox type (automatic manual transmission, AMT). Automatic gearboxes and automatic manual gearboxes are automated gearbox systems usually controlled by a control unit 110 (sometimes also called electronic control unit, ECU) which is adapted to controlling the gearbox 20, e.g. during gear changing, as when choosing gears at a certain vehicle speed with a certain running resistance. The ECU may measure engine speed and the state of the gearbox 20 and control the gearbox by means of solenoid valves connected to compressed air devices. Information about the engine 10, e.g. its speed and torque, is also sent from the engine 10 to the ECU, e.g. via a CAN (controller area network) bus. In conventional gear change systems, the control unit 110 uses tabulated engine speed limits, also called shift points, which represent the engine speed at which a downshift or upshift should be effected in the gearbox 20, i.e. the vehicle 1 changes gear when the speed of its engine 10 passes a speed represented by a shift point. The shift points may therefore be construed as providing information not only about when a downshift or upshift should take place but also about the number of gear steps to be effected at each downshift or upshift. It is usual for each shift point to comprise one to three gear steps, but more steps are possible.

FIG. 2 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4 no gear change takes place, but if it rises above an upshift line, SP1-SP3, an upshift is initiated, and similarly a downshift is initiated if the engine speed drops below a downshift line, SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 | |
|---|---|
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia the running characteristics and fuel consumption for the vehicle 1, so shift points have to be accurately calibrated by vehicle manufacturers. This calibration involves various gearshift strategies being tested in the field in different driving situations, e.g. with different amounts of acceleration applied, different road gradients and different vehicle-combination weights. The test results have then to be thoroughly analysed to determine appropriate shift points.

Numbers of gear steps in conventional gear change systems are also arrived at by regularly measuring the acceleration of the vehicle 1 and using the measured data to determine the number of steps. In such conventional systems, high measured acceleration leads to more gear steps and low measured acceleration to fewer steps. The measured acceleration is then compared with various acceleration threshold values stored in tables, and the determination of said threshold values decides how many steps should be executed when changing gear in a given driving situation. The threshold values are engine-dependent and therefore suited to a specific engine 10. Determining appropriate threshold values involves manufacturers of vehicles carrying out extensive calibrations in order to arrive at them. The calibration procedure is both expensive and time-consuming. It is also not uncommon that using tabulated acceleration threshold values leads to adopting wrong numbers of gear steps.

BRIEF DESCRIPTION OF THE INVENTION

An object of the present invention is to propose an alternative method for determination of numbers of gear steps required when changing gear in a gearbox. Another object of the invention is to propose a method which totally or partly solves the problems of the state of the art.

According to an aspect of the invention, the above objects are achieved with a method for determination of numbers of gear steps N for a gearbox in a motor vehicle. The vehicle comprises an engine connected to drive the gearbox, and the numbers of gear steps N being the number of downward steps or the number of upward steps which the gearbox is respectively adapted to effecting at an upshift or a downshift point, where a downshift point represents a first engine speed at which the gearbox is adapted to effecting a downshift, an upshift point represents a second engine speed at which the gearbox is adapted to effecting an upshift, and the numbers of gear steps N are determined on the basis of a predicted time period T, which is the time which the engine takes to change from a first speed $\omega_1$ at a first point in time to a second speed $\omega_2$ at a second point in time.

Embodiments of the above method are referred to in the dependent claims 2-10.

The invention further relates to a computer program comprising program code which, when the program code is executed in a computer, causes the computer to effect the method. The invention further relates to a computer program product belonging to the computer program.

According to another aspect of the invention, the above objects are achieved with a system for determination of numbers of gear steps N, comprising at least one control unit adapted to controlling a gearbox in a motor vehicle which comprises an engine connected to drive the gearbox, and the numbers of gear steps N being the number of downshifts or the number of upshifts which the gearbox is respectively adapted to effecting at an upshift point or a downshift point, where a downshift point represents a first engine speed at which the gearbox is adapted to effecting a downshift, an upshift point represents a second engine speed at which the gearbox is adapted to effecting an upshift, and the system is adapted to determining said numbers of gear steps N on the basis of a predicted time period T, which is the time which said engine takes to change from a first speed $\omega_1$ at a first point in time to a second speed $\omega_2$ at a second point in time.

The system according to the invention may also be modified according to the various embodiments of the above method. The invention further relates to a motor vehicle 1 which comprises at least one system as above.

An advantage of the invention is that a more adequate measure is provided for determination of numbers of gear steps. This predicted time measure is based on relevant physical and mechanical parameters. This makes it possible to reduce the number of incorrect gear step choices, resulting in lower fuel consumption, better drivability etc. Another advantage of the invention is that determinations of the number of gear steps can be done more quickly with the method and the system according to the invention than according to the state of the art, since measurements of the vehicle's acceleration become superfluous.

Further advantages and applications of a method and a system according to the invention are indicated by the detailed description set out below.

BRIEF DESCRIPTION OF THE DRAWINGS

In the detailed description of the invention set out below, embodiments of the invention are described with reference to the attached drawings, in which.

DETAILED DESCRIPTION OF THE INVENTION

Figure 1:
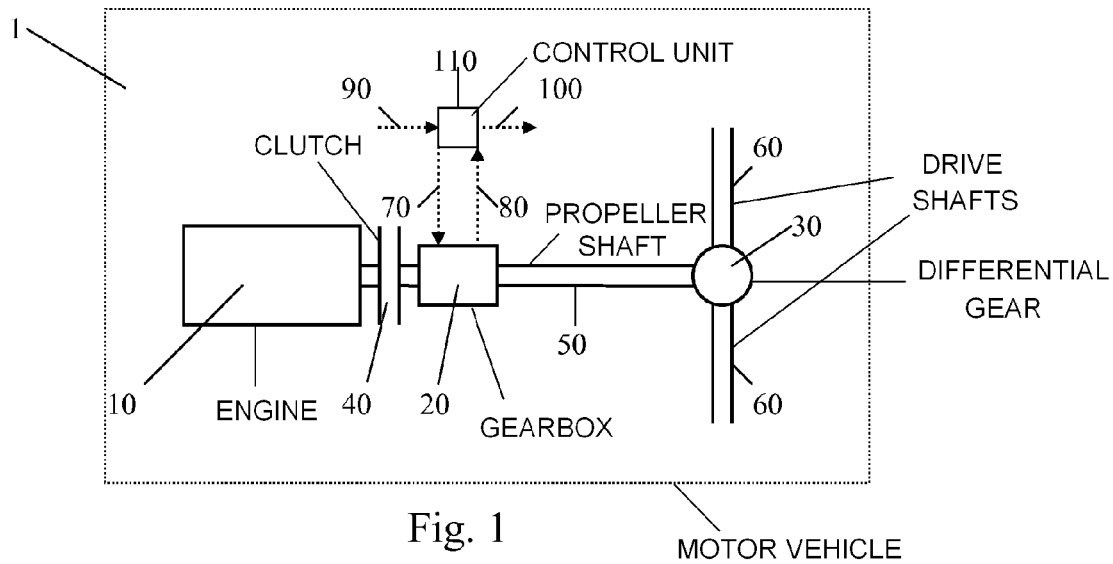
FIG. 1 depicts schematically part of a power train for a motor vehicle with rear wheel drive.
Figure 2:
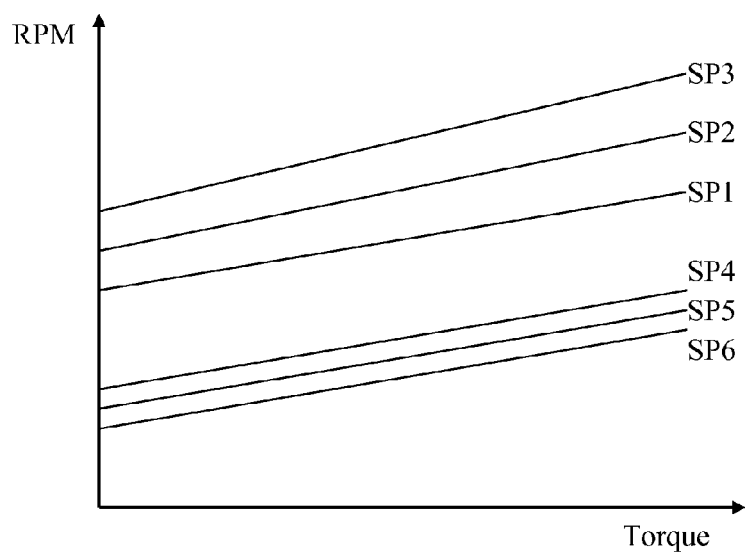
FIG. 2 is a schematic graph of downshift an upshift lines.

As indicated by the above background description, the number of gear steps in conventional systems is determined by regularly measuring the acceleration of the motor vehicle 1. This procedure does not take into account certain factual circumstances which affect the adequacy of measured acceleration as an input parameter for determining the number of gear steps.

For example, the acceleration may vary when the engine speed increases when a vehicle 1 accelerates. This variation may be because the torque delivered by the engine 10 varies between different engine speeds. Therefore, if the acceleration is low at low engine speed, it may appear that the acceleration is sufficient when the engine 10 approaches its maximum power output speed, i.e. the speed at which it delivers the greatest power. Making good step choices (numbers of gear steps) therefore entails having to adjust the threshold values for the acceleration so that they assume low enough values to allow appropriate step choices at the speeds at which the engine 10 delivers least power.

Another factor affecting the number of gear steps is the effects of applying rapid acceleration to engines 10 with turbos. Turbocharged engines 10 do not deliver full torque until they have built up sufficient air flow through the turbo, which means that if changing gear is adopted in such a situation the acceleration of the vehicle 1 will not correspond to the power which is available with the turbo after a certain time.

These and other factors result in considerable risk that conventional gear change systems may choose incorrect numbers of gear steps because measured acceleration is not an optimum input parameter for determining the number of gear steps. The acceleration measurement procedure also leads to delay in determining the number of steps, since signals from acceleration measuring sensors have to be analysed before they can be used in step choice determination. Using measured acceleration as in the state of the art may therefore also lead to incorrect step choices because of delayed availability of measurement results.

In contrast, the solution according to the invention is based on assumptions about certain mathematical relationships between various physical and mechanical magnitudes which affect the acceleration of the vehicle 1. On these assumptions it is possible to derive a predicted time period T which is then used in determining numbers of gear steps N for changing gear in a gearbox 20 in a vehicle 1. The gearbox 20 is preferably of the kind which forms part of an automated gear change system controlled by a control unit 110, e.g. an ECU. In such a system, gears are changed automatically by the control unit 110, but it is also usual for the driver to be able to execute manual gear changes in such a system, what is known as manual gear change in automatic state (automatic mode). The gearbox 20 also has a plurality of gears, e.g. twelve forward gears and one or more reverse gears are usual in modern trucks. The number of gear steps N may vary but is preferably somewhere between one and eight.

Using a predicted time period T provides an input parameter which more adequately represents the acceleration of the vehicle 1 for determination of the number of gear steps N. More adequate in this context means that using predicted time period T results in better determinations of the number of steps N for gear changes, since the predicted time period T is a more correct and more precise measure for step choice determination. The predicted time period T may preferably be used as a threshold value in step choice determination, which means that different threshold values of the time period T represent different numbers of gear steps N.

A basic concept of the invention is to use for determination of the number of gear steps N a predicted time period T which is the time which said engine 10 takes to change from a first speed $\omega_1$ at a first point in time to a second speed $\omega_2$ at a second point in time. The first point in time is a current point in time and the second point in time is a time at which a downshift or an upshift is initiated.

The present invention thus proposes an alternative and better method for determination of numbers of gear steps N for a gearbox 20. As described above, the reason is that predicted time period T is a more adequate measure for step choice determination because it better predicts the behaviour of the vehicle 1.

According to an embodiment of the invention, the time period T is determined on the basis of assuming the relationships in equations (1) to (3)

$$M = J\dot{\omega} \quad (1)$$

$$M = M_e - \frac{F_{res}r}{i} \quad (2)$$

$$J = m + I_e \frac{i^2}{r^2} \quad (3)$$

where M is accelerating torque, J the vehicle's inertia, $\omega$ the engine speed, $M_e$ the torque for the engine's flywheel, $F_{res}$ running resistance, r the wheel radius, i total transmission ratio, m the weight of the vehicle and $I_e$ the engine's moment of inertia;
which relationships are expressed by equation (4)

$$\frac{d\omega}{dt} = \dot{\omega} = \frac{M}{J} = \frac{M_e - \frac{F_{res}r}{i}}{m + I_e \frac{i^2}{r^2}} \quad (4)$$

resulting finally in the predicted time period T according to equation (5)

$$T = \int_{\omega_1}^{\omega_2} \frac{M_e - \frac{F_{res}r}{i}}{m + I_e \frac{i^2}{r^2}} d\omega \quad (5)$$

According to another embodiment of the invention, the time period T is also expressed by the relationship in equation (6)

$$T = \frac{\Delta\omega}{a} \quad (6)$$

where $\Delta\omega=\omega_2-\omega_1$, i.e. the difference between a current engine speed and the engine speed for initiating a gear change, and a is the mean acceleration during the time period T. Thus the predicted time period T is also determined on the basis of the mean acceleration of the vehicle 1 with knowledge of $\Delta\omega$.

The predicted time period T may also, according to a further embodiment, be calculated in real time, e.g. by a control unit 110 such as an ECU, by means of the above equations. The result is immediate adjustment of the choice of the number of gear steps N to changed running conditions for the vehicle 1.

Figure 3:
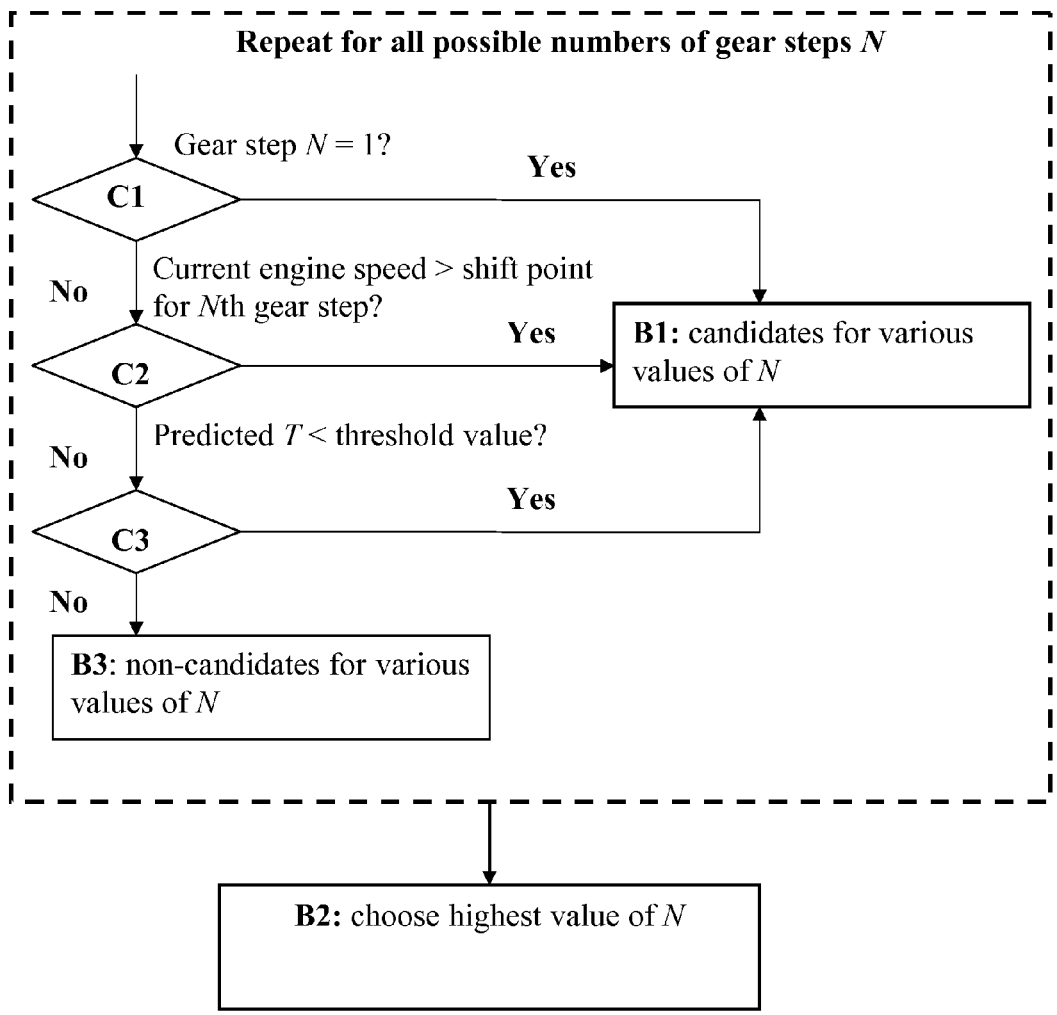
FIG. 3 is a flowchart of an embodiment of the invention.

An embodiment of the invention is described below with reference to the flowchart in FIG. 3. FIG. 3 illustrates the steps of choosing numbers of gear steps at an upshift. Choosing numbers of gear steps N as a function of a predicted time period T comprises, in this embodiment, calculating a predicted time period T for each number of gear steps N with associated shift points, i.e. predicted time from current engine speed to the time when the shift point (the engine speed) is reached and gearchanging is initiated. This is followed by checking which gear steps N result in good ride comfort, which may be expressed as driver and passengers feeling that the gear system changes gear harmoniously. For example, for a chosen gear to provide good ride comfort, any of the three following conditions has to be fulfilled:

number of gear steps N=1, since at least one possible candidate gear is always required, current engine speed being higher than the shift point for the Nth gear step, or predicted time period T between current engine speed and the shift point for the Nth gear step being lower than a predetermined threshold value, where the reason for having time threshold values is that long gear steps (large values of N) are only felt to be good if the shift points are reached quickly.

These three conditions correspond to C1-C3 in FIG. 3. Values of N which fulfil any of them go into box B1 on the right in FIG. 3, which contains all possible candidates for various values of N. Values of N which do not fulfil any of the three conditions end up in box B3 with all of the non-candidates. Finally, which of all the N candidates assumes the highest value is determined in box B2. On the above reasoning, N=1 will always be a candidate.

For example, if N=1, 2, 3, 4 are possible candidates for the number of gear steps, the gear system will choose N=4 according to this embodiment.

Still referring to FIG. 3, choosing numbers of gear steps at a downshift, according to an embodiment of the invention, is done by determining whether the current engine speed is less than the shift point for the Nth gear step (at C2) and whether the predicted time period T between current engine speed and the shift point for the Nth gear step is lower than a predetermined threshold value (at C3).

Specialists will also appreciate that a method for determination of numbers of gear steps N according to the present invention might also be implemented in a computer program which, when executed in a computer, causes the computer to effect the method. The computer program is contained in a computer program product's computer-readable medium which takes the form of a suitable memory, e.g. ROM (read-only memory), PROM (programmable read-only memory), EPROM (erasable PROM), flash memory, EEPROM (electrically erasable PROM), hard disc unit, etc.

The invention relates also to a system for determination of numbers of gear steps N. The system comprises at least one control unit 110 (e.g. an ECU for a gearbox 20) adapted to controlling a gearbox 20 in a motor vehicle 1. The gearbox 20 is connected to an engine 10 which drives the gearbox 20 and other parts of the power train. The number of gear steps N is the number of downshifts or the number of upshifts which the gearbox 20 is respectively adapted to effecting at an upshift point or a downshift point. A downshift point represents a first engine speed at which the gearbox 20 is adapted to effecting a downshift, and an upshift point represents a second engine speed at which the gearbox 20 is adapted to effecting an upshift. The system is further adapted to determining said number of gear steps N on the basis of a predicted time period T which is the time the engine 10 takes to change from a first speed $\omega_1$ at a first point in time to a second speed $\omega_2$ at a second point in time.

Figure 4:
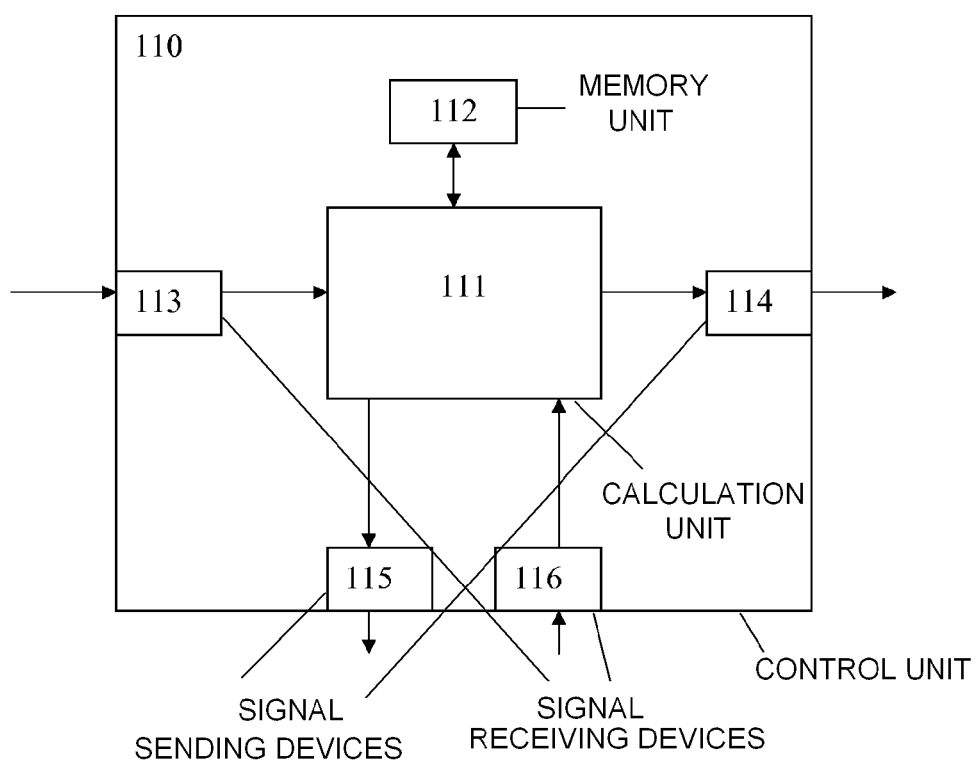
FIG. 4 depicts a control unit forming part of a system according to the invention.

FIG. 4 depicts schematically a control unit 110. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs for it to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals which are processable by the calculation unit 111. The calculation unit 111 is then provided with these signals. The signal sending devices 114, 115 are adapted to converting signals received from the calculation unit 111 in order to create, eg by modulating the signals, output signals which can be transmitted to other parts of the system for determination of downshift an upshift points. One skilled in the art will appreciate that the aforesaid computer may take the form of the calculation unit 111 and that the aforesaid memory may take the form of the memory unit 112.

Each of the connections to the respective devices for respectively receiving input signals or sending output signals may take the form of one or more from among the following: cable, data bus, e.g. CAN (controller area network) bus, MOST (media orientated systems transport) bus or some other bus configuration, or a wireless connection. The connections 70, 80, 90, 100 in FIG. 1 may also take the form of one or more of these cables, buses or wireless connections.

Specialists will also appreciate that the above system may be modified according to the various embodiments of the method for determination of numbers of gear steps N according to the invention. The invention relates also to a motor vehicle 1, e.g. a truck or bus, comprising at least one system for determination of numbers of gear steps N according to the invention.

Finally, the present invention is not limited to its embodiments described above, but relates to and comprises all embodiments within the scope of protection of the attached independent claims.

The invention claimed is:

1. A method for determination of numbers of gear steps N for a gearbox in a motor vehicle, wherein the vehicle comprises an engine connected to drive the gearbox, and the numbers of gear steps N are the number of downshifts or the number of upshifts which the gearbox effects at an upshift point or a downshift point, and wherein a downshift point represents a first engine speed at which the gearbox effects a downshift, and an upshift point represents a second engine speed at which the gearbox effects an upshift, the method comprising the step of:
   determining the numbers of gear steps N on the basis of a predicted time period T which the engine takes to change from a first engine speed $\omega_1$ at a first point in time to a second engine speed $\omega_2$ at a second point in time, wherein the time period T is determined as a function of a predicted mean acceleration a of the vehicle during the time period T.

2. A method according to claim 1, wherein the first point in time is a current point in time and the second point in time is a point in time at which a downshift or upshift is initiated.

3. A method according to claim 1, wherein the time period T depends on the predicted mean acceleration a of the vehicle as follows:

$$T = \frac{\Delta\omega}{a} \text{ where}$$
$$\Delta\omega = \omega_2 - \omega_1.$$

4. A method for determination of numbers of gear steps N for a gearbox in a motor vehicle, wherein the vehicle comprises an engine connected to drive the gearbox, and the numbers of gear steps N are the number of downshifts or the number of upshifts which the gearbox effects at an upshift point or a downshift point, and wherein a downshift point represents a first engine speed at which the gearbox effects a downshift, and an upshift point represents a second engine speed at which the gearbox effects an upshift, the method comprising the step of:
   determining the numbers of gear steps N on the basis of a predicted time period T which the engine takes to change from a first engine speed $\omega_1$ at a first point in time to a second engine speed $\omega_2$ at a second point in time.

5. A method according to claim 4, in which the time period T is determined according to $$T = \int_{\omega_1}^{\omega_2} \frac{M_e - \frac{F_{res}r}{i}}{m + I_e \frac{i^2}{r^2}} d\omega$$

where $M_e$ is a torque for a flywheel of the engine, $I_e$ is the moment of inertia of the engine and $F_{res}$, r, i and m are respectively a running resistance, a wheel radius, a total transmission ratio and a weight for the vehicle.

6. A method according to claim 4, wherein the time period T is predicted in real time.

7. A method according to claim 4, wherein the time period T is used as a threshold value in determining the numbers of gear steps N.

8. A method according to claim 4, wherein the numbers of gear steps N range from one to eight.

9. A method according to claim 4, wherein the gearbox is controlled by a control unit and wherein the gearbox is an automatic gearbox or an automated manual gearbox comprising a plurality of gears, and the vehicle is within a category which comprises trucks and buses.

10. A method according to claim 4, wherein the first point in time is a current point in time and the second point in time is a point in time at which a downshift or upshift is initiated.

11. A method for using numbers of gear steps N in conjunction with corresponding one or more downshift and an upshift points when changing gear in a gearbox in a motor vehicle, wherein the numbers of gear steps N are determined according to a method for determination of numbers of gear steps N for a gearbox in a motor vehicle, wherein the vehicle comprises an engine connected to drive the gearbox, and the numbers of gear steps N are the number of downshifts or the number of upshifts which the gearbox effects at an upshift point or a downshift point, and wherein a downshift point represents a first engine speed at which the gearbox effects a downshift, and an upshift point represents a second engine speed at which the gearbox effects an upshift, the method comprising the step of:

determining the numbers of gear steps N on the basis of a predicted time period T which the engine takes to change from a first engine speed $\omega_1$ at a first point in time to a second engine speed $\omega_2$ at a second point in time.

12. A computer program comprising program code such that, when the program code is executed in a computer, the computer determines numbers of gear steps N for a gearbox in a motor vehicle, wherein the vehicle comprises an engine connected to drive the gearbox, and the numbers of gear steps N are the number of downshifts or the number of upshifts which the gearbox effects at an upshift point or a downshift point, and wherein a downshift point represents a first engine speed at which the gearbox effects a downshift, and an upshift point represents a second engine speed at which the gearbox effects an upshift, the numbers of gear steps N being determined on the basis of a predicted time period T which the engine takes to change from a first engine speed $\omega_1$ at a first point in time to a second engine speed $\omega_2$ at a second point in time.

13. A computer program product comprising a non-transitory computer-readable storage medium and a computer program according to claim 12, wherein the computer program is stored on the non-transitory computer-readable storage medium.

14. A system for determination of numbers of gear steps N, in a gearbox of a motor vehicle, wherein the motor vehicle comprises an engine connected to drive the gearbox, and the numbers of gear steps N are the number of downshifts or the number of upshifts which the gearbox respectively effects at an upshift point or a downshift point, wherein a downshift point represents a first engine speed at which the gearbox effects a downshift, and an upshift point represents a second engine speed at which the gearbox effects an upshift, at least one control unit controlling the gearbox in the motor vehicle by determining the numbers of gear steps N on the basis of a predicted time period T which is the time which the engine takes to change from a first engine speed $\omega_1$ at a first point in time to a second engine speed $\omega_2$ at a second point in time.

15. A motor vehicle comprising at least one system for determination of numbers of gear steps N, in a gearbox of a motor vehicle, wherein the motor vehicle comprises an engine connected to drive the gearbox, and the numbers of gear steps N are the number of downshifts or the number of upshifts which the gearbox respectively effects at an upshift point or a downshift point, wherein a downshift point represents a first engine speed at which the gearbox effects a downshift, and an upshift point represents a second engine speed at which the gearbox effects an upshift, at least one control unit controlling the gearbox in the motor vehicle by determining the numbers of gear steps N on the basis of a predicted time period T which is the time which the engine takes to change from a first engine speed $\omega_1$ at a first point in time to a second engine speed $\omega_2$ at a second point in time.

* * * * *

UNITED STATES PATENT AND TRADEMARK OFFICE
CERTIFICATE OF CORRECTION

PATENT NO.       : 8,706,365 B2
APPLICATION NO.  : 13/393557
DATED            : April 22, 2014
INVENTOR(S)      : Swartling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 40 days.

Signed and Sealed this
Twenty-ninth Day of September, 2015

Michelle K. Lee
*Director of the United States Patent and Trademark Office*